United States Patent
Pokhil et al.

(10) Patent No.: US 7,684,150 B2
(45) Date of Patent: Mar. 23, 2010

(54) RECORDING HEAD FOR REDUCING SIDE TRACK ERASURE

(75) Inventors: Taras Grigoryevich Pokhil, Arden Hills, MN (US); Nurul Amin, Woodbury, MN (US); Steven Paul Bozeman, Savage, MN (US); Steven Albert Kalderon, Minneapolis, MN (US); Andrzej Adam Stankiewicz, Edina, MN (US); Ned Tabat, Chanhassen, MN (US); Pu-Ling Lu, Rosemount, MN (US); Johannes Van Ek, Minnetonka, MN (US); Janusz Jozef Nowak, Mahopac, NY (US); Patrick Joseph Ryan, Saint Paul, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 600 days.

(21) Appl. No.: 10/881,015

(22) Filed: Jun. 30, 2004

(65) Prior Publication Data

US 2006/0002020 A1    Jan. 5, 2006
US 2009/0251827 A9    Oct. 8, 2009

Related U.S. Application Data

(60) Provisional application No. 60/485,654, filed on Jul. 9, 2003.

(51) Int. Cl.
*G11B 5/127* (2006.01)
(52) U.S. Cl. .............................................. 360/125.57
(58) Field of Classification Search ....................... None
See application file for complete search history.

(56) References Cited

U.S. PATENT DOCUMENTS

| 5,134,535 | A | * | 7/1992 | Mallary | 360/126 |
| 5,157,570 | A | * | 10/1992 | Shukovsky et al. | 360/126 |
| 5,208,715 | A | | 5/1993 | Mowry | 360/11 |
| 5,311,387 | A | | 5/1994 | Mallary | 360/126 |
| 5,379,172 | A | * | 1/1995 | Liao | 360/126 |
| 5,581,429 | A | * | 12/1996 | Furuichi et al. | 360/126 |

(Continued)

FOREIGN PATENT DOCUMENTS

EP    0389143   A2    11/1997

(Continued)

OTHER PUBLICATIONS

Mallary et al., "One Terabit per Square Inch Perpendicular Recording Conceptual Design", IEEE Transactions on Magnetics, vol. 38, No. 4, pp. 1719-1724, Jul. 2002.

(Continued)

*Primary Examiner*—David D Davis
(74) *Attorney, Agent, or Firm*—Westman, Champlin & Kelly, P.A.

(57) ABSTRACT

The present invention relates to a head having an air bearing surface for confronting the surface of a storage medium. The head includes a first pole that is spaced apart from a second pole. At least one non-magnetic spacer is positioned between the first pole and the second pole such that the first pole is magnetically decoupled from the second pole. In a further aspect, one or both of the first pole and the second pole can be elliptical in shape.

16 Claims, 6 Drawing Sheets

U.S. PATENT DOCUMENTS

| | | | |
|---|---|---|---|
| 5,805,391 A * | 9/1998 | Chang et al. | 360/317 |
| 5,872,693 A | 2/1999 | Yoda et al. | 360/126 |
| 6,125,010 A * | 9/2000 | Keel et al. | 360/126 |
| 6,259,583 B1 * | 7/2001 | Fontana et al. | 360/126 |
| 6,433,968 B1 * | 8/2002 | Shi et al. | 360/317 |
| 6,456,467 B1 | 9/2002 | Mao et al. | 360/319 |
| 6,496,335 B2 | 12/2002 | Gill | 360/319 |
| 6,612,017 B2 * | 9/2003 | Santini | 29/603.12 |
| 6,693,768 B1 | 2/2004 | Crue et al. | 360/126 |
| 6,721,131 B2 | 4/2004 | Litvinov et al. | 360/125 |
| 6,781,790 B1 * | 8/2004 | Sasaki | 360/126 |
| 6,791,796 B2 * | 9/2004 | Shukh et al. | 360/126 |
| 7,085,099 B2 * | 8/2006 | Sasaki et al. | 360/123 |
| 7,151,647 B2 * | 12/2006 | Sasaki et al. | 360/126 |
| 2002/0036871 A1 | 3/2002 | Yano et al. | 360/317 |
| 2003/0137779 A1 | 7/2003 | Santini et al. | 360/317 |
| 2004/0021985 A1 * | 2/2004 | Pokhil et al. | 360/126 |
| 2004/0047079 A1 | 3/2004 | Ito et al. | 360/317 |
| 2005/0128639 A1 * | 6/2005 | Sasaki et al. | 360/126 |

FOREIGN PATENT DOCUMENTS

| | | |
|---|---|---|
| GB | 2268617 A | 6/1993 |
| JP | 10105917 A | 9/1996 |
| JP | 200048317 A | 8/1998 |
| JP | 2022197608 A | 7/2002 |

OTHER PUBLICATIONS

Yamakawa et al., "High Writability Head with Robustness Against Stray Field and Narrow-Track Recording Properties", IEEE Transactions on Magnetics, vol. 38, No. 4, pp. 1652-1657, Jul. 2002.

* cited by examiner

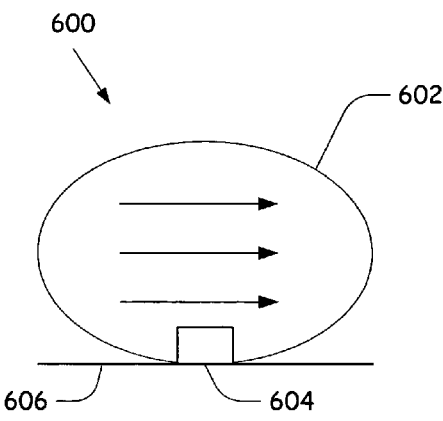
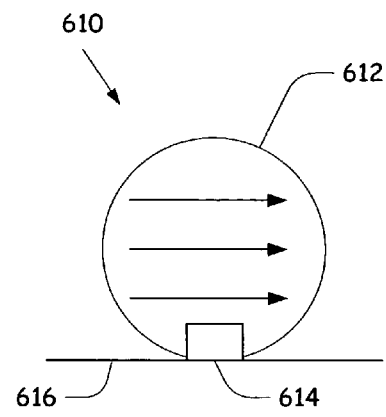
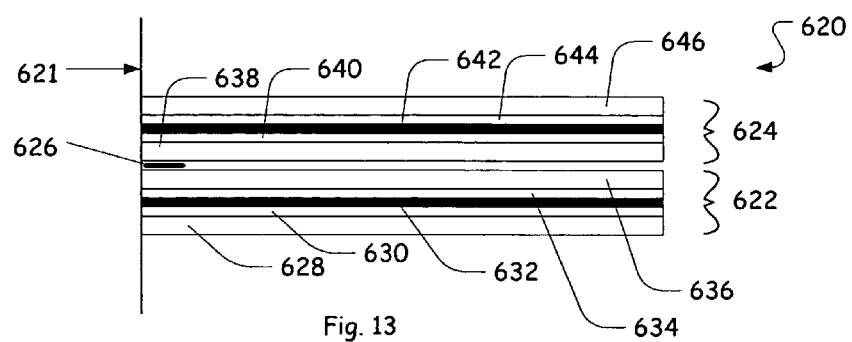

RECORDING HEAD FOR REDUCING SIDE TRACK ERASURE

CROSS REFERENCE TO RELATED APPLICATION

The present application is based on and claims the benefit of U.S. Provisional Patent Application Ser. No. 60/485,654 entitled PERPENDICULAR RECORDING WRITER DESIGN FOR SIDE ERASURE SOLUTION filed Jul. 9, 2003.

FIELD OF THE INVENTION

The present invention relates to a recording head, and more particularly but not by limitation to a recording head for a data storage assembly.

BACKGROUND OF THE INVENTION

In an electronic data storage and retrieval system, a transducing head typically includes a writer for storing magnetically-encoded information on a magnetic disc and a reader for retrieving that magnetically-encoded information from the magnetic disc. The reader typically consists of two shields and a magnetoresistive (MR) sensor positioned between the shields. Magnetic flux from the surface of the disc causes rotation of the magnetization vector of a sensing layer of the MR sensor, which in turn causes a change in electrical resistivity of the MR sensor. This change in resistivity of the MR sensor can be detected by passing a current through the MR sensor and measuring a voltage across the MR sensor. External circuitry then converts the voltage information into an appropriate format and manipulates that information as necessary.

The writer portion typically consists of a top and a bottom pole, which are separated from each other at an air bearing surface of the writer by a gap layer, and which are connected to each other at a region distal from the air bearing surface by a back gap closer or back via. Positioned between the top and bottom poles are one or more layers of conductive coils encapsulated by insulating layers. The writer portion and the reader portion are often arranged in a merged configuration in which a shared pole serves as both the top shield in the reader portion and the bottom pole in the writer portion.

To write data to the magnetic media, an electrical current is caused to flow through the conductive coils to thereby induce a magnetic field across the write gap between the top and bottom poles. By reversing the polarity of the current through the coils, the polarity of the data written to the magnetic media is also reversed. Because the top pole is generally the trailing pole of the top and bottom poles, the top pole is used to physically write the data to the magnetic media. Accordingly, it is the top pole that defines the track width of the written data. More specifically, the track width is defined by the width of the top pole near the write gap at the air bearing surface.

In magnetic recording, it is desirable to improve the areal density at which information can be recorded and reliably read. This desire has led to a trend toward shorter bit length along a magnetic recording track and a shrinking track width. Narrow track widths are achieved by use of narrow pole tips at an air bearing surface (ABS) of the head.

Elements of conventional writers do not properly contain the magnetic flux within the elements themselves and part of the flux leaks into adjacent elements. The result of this leakage is unintentional erasure of side tracks due to the parasitic field established near the susceptible soft under-layer structure within the media. Additionally, the need to increase magnetic recording density results in reducing the size of the read element and shields, causing instability of the domain wall structure. This instability leads to degradation of head performance and increased error rate. Thus, in conventional head designs, there exists increased parasitic affects from the size and shape of the write portion components and reduced magnetic stability of the read portion leading to low head performance and side track erasure.

Therefore, elements of the recording head need to be sized and positioned such that the parasitic field may be reduced or eliminated by improving the spin structure to be less susceptible to dynamic distortion and the read portion needs to provide a more stable magnetic shield having high permeability.

SUMMARY OF THE INVENTION

The present invention relates to a head having an air bearing surface for confronting the surface of a storage medium. The head includes a first pole that is spaced apart from a second pole. At least one non-magnetic spacer is positioned between the first pole and the second pole such that the first pole is magnetically decoupled from the second pole. In a further aspect, one or both of the first pole and the second pole can be elliptical in shape.

Another aspect of the present invention relates to a head having a read element and first and second read shields positioned on opposite sides of the read element. The first and second shields can be elliptically shaped. In a further aspect, the read shields can be formed by a laminated structure to include alternating ferromagnetic and non-ferromagnetic layers with an anti-ferromagnetic exchange coupling implemented between adjacent ferromagnetic layers.

Yet another aspect of the present invention relates to a magnetic recording head having a write portion including a first pole defining a bearing surface plane and a second pole spaced apart from the first pole to define a gap therebetween. A yoke is coupled to the first pole and positioned between the first pole and the second pole. A read portion includes a read element positioned on a side of the second pole opposite to that of the first pole and a pair of read shields are positioned on opposing sides of the read element. The pair of read shields are spaced apart from the second pole. A non-magnetic shield is positioned between the write portion and the read portion.

Other features and benefits that characterize embodiments of the present invention will be apparent upon reading the following detailed description and review of the associated drawings.

BRIEF DESCRIPTION OF THE DRAWINGS

FIGS. 11-12 are schematic top down views of reader portions in accordance with alternative embodiments of the present invention.

FIG. 13 is a cross-section view of a read portion according to an embodiment of the present invention.

DETAILED DESCRIPTION OF ILLUSTRATIVE EMBODIMENTS

Figure 1:
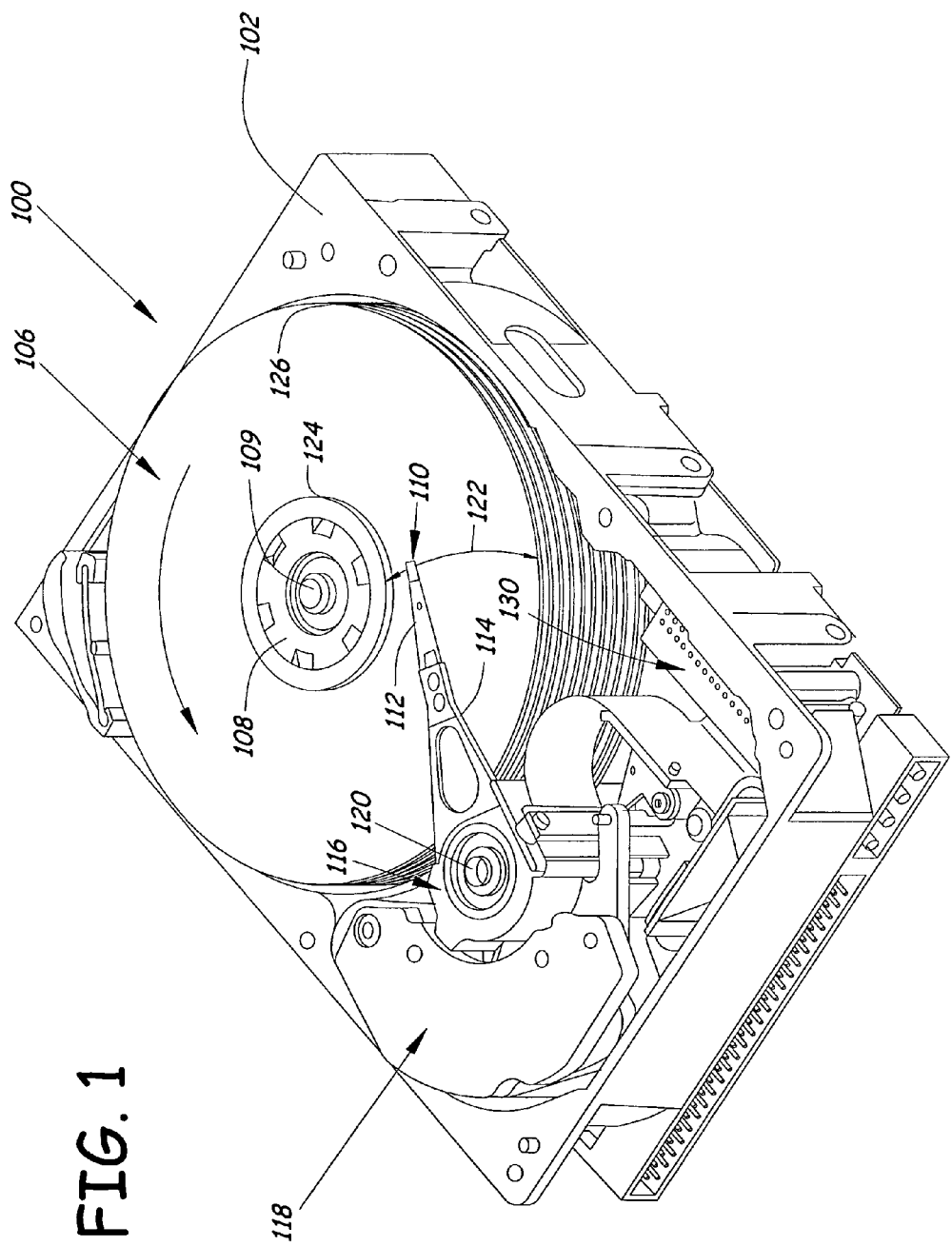
FIG. 1 is an isometric view of a disc drive.

FIG. 1 is a perspective view of a disc drive 100 in which the present invention is useful. Disc drive 100 can be configured as a traditional magnetic disc drive, a magneto-optical disc drive or an optical disc drive, for example. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110, which is mounted to disc drive 100 and carries a read/write head for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 130. Other types of actuators can also be used, such as linear actuators.

In accordance with the present invention, several configurations for the read/write head carried by slider 110 are described below. Elements of the read/write head can be of different shapes and sizes as well as be positioned differently with respect to other elements. FIGS. 2-6 are cross-sectional views for different read/write heads. FIGS. 7-10 are schematic views of alternative writer portions of the read/write heads and FIGS. 11-13 are schematic views of alternative reader portions of the read/write heads.

Figure 2:
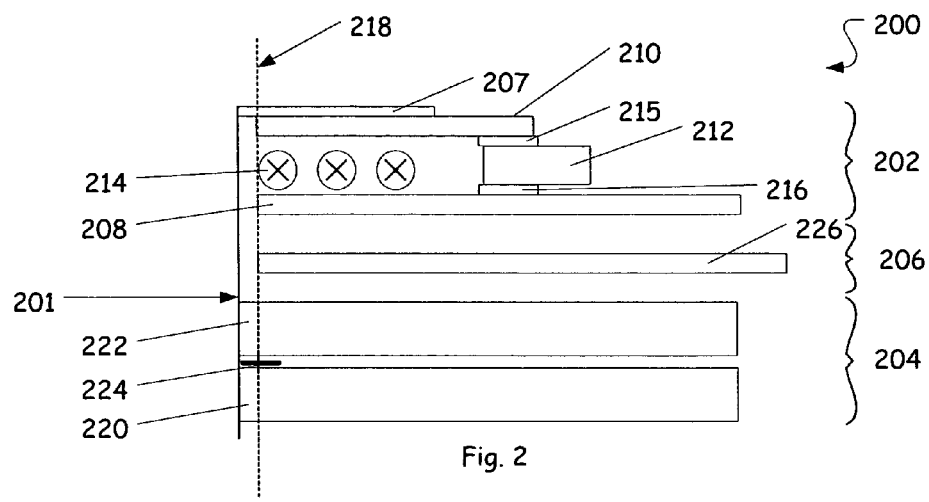
FIGS. 2-6 are cross-sectional views of magnetic heads according to alternative embodiments of the present invention.

FIG. 2 illustrates a cross-sectional view of a read/write head 200 that is taken along a plane normal to a bearing surface 201 of the read/write head 200. Read/write head 200 can be incorporated into disc drive 100 of FIG. 1. Read/write head 200 includes a write portion 202 and a read portion 204, which are separated by a gap 206. In FIG. 2, the write portion 202 includes a main (or first) pole 207 spaced apart from a return (or second) pole 208 by a yoke 210 and a back via 212. A write coil 214 is positioned between main pole 207 and return pole 208.

Additionally, a first spacer 215 is positioned between the yoke 210 and back via 212 and a second spacer 216 is positioned between return pole 208 and back via 212. The first spacer 215 and second spacer 216 can be non-magnetic in order to magnetically decouple the main pole 207 from the return pole 208. The first spacer 215 and second spacer 216 act to reduce distortion of magnetic spin structures of yoke 210 and return pole 208 that can occur due to interactions with back via 212. Additionally, spacers 215 and 216 can prevent magnetic flux leakage from the main is pole 207 to return pole 208. In one embodiment, spacers 215 and 216 can be of any non-magnetic material, including metallic materials such as Ru, Cu, Cr, Au, Ag and/or alloys thereof. The material can also be an insulating material such as aluminum oxide. In the embodiment illustrated, return pole 208 defines a plane 218 that is displaced (recessed) from bearing surface 201. Thus, a greater separation exists between return pole 208 and a corresponding media than the separation between bearing surface 201 and the media. By recessing return pole 208 from bearing surface 201, any magnetic fields emanating from return pole 208 will have a reduced parasitic effect upon the magnetic storage media.

Read portion 204 includes read shields 220 and 222, respectively, which are positioned on opposing sides of a read element 224. In one embodiment, read element 224 can include a giant magnetoresistive stack. Read portion 204 is spaced apart from write portion 202 to reduce magnetic flux leakage from return pole 208 to read portion 204. In one embodiment, gap 206 between write portion 202 and read portion 204 is of a distance greater than the distance from bearing surface 201 to plane 218. In an additional embodiment of the present invention, an electromagnetic shield 226 is located within gap 206, which further protects the read element 224 from any induced current produced by write coil 214 and/or return pole 208. Shield 226 can be a non-magnetic, electrically conductive material to prevent disturbance in operation of read element 224.

Figure 3:
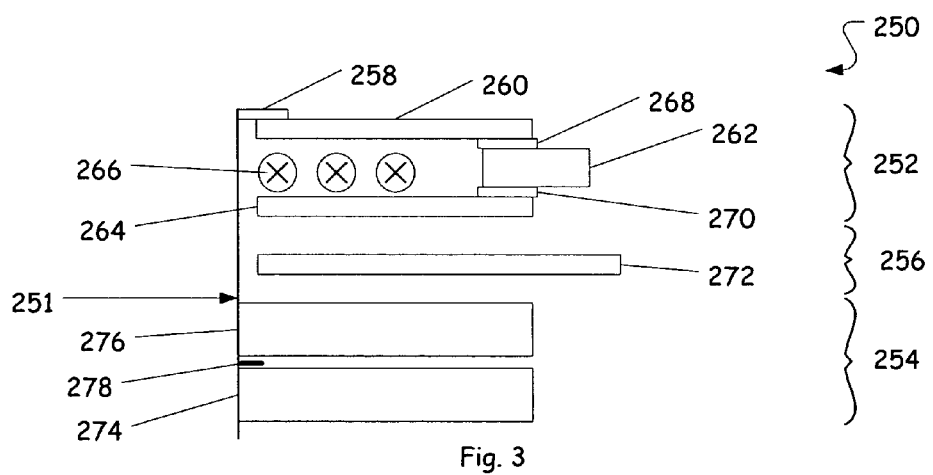

FIG. 3 is a cross-sectional view of an alternative embodiment of the present invention. Read/write head 250 has an air bearing surface 251 and includes a write portion 252 and a read portion 254 that is spaced apart from write portion 252 by a gap 256. Write portion 252 includes a main pole 258, a yoke 260, a back via 262, a return pole 264 and a write coil 266. A first non-magnetic spacer 268 is positioned between yoke 260 and back via 262 to magnetically decouple main pole 258 from back via 262. Furthermore, a second non-magnetic spacer 270 is positioned between return pole 264 and back via 262. As illustrated in FIG. 3, return pole 264 is of a substantially similar shape to that of yoke 260. Additionally, the size of main pole 258 and shield 272 separating write portion 252 and read portion 254 can be of reduced size when compared to similar elements illustrated in FIG. 2. Read portion 254 includes read shields 274 and 276 that are of reduced size compared to shields 220 and 222, respectively, of FIG. 2. Read element 278 is positioned between shields 274 and 276.

Figure 4:
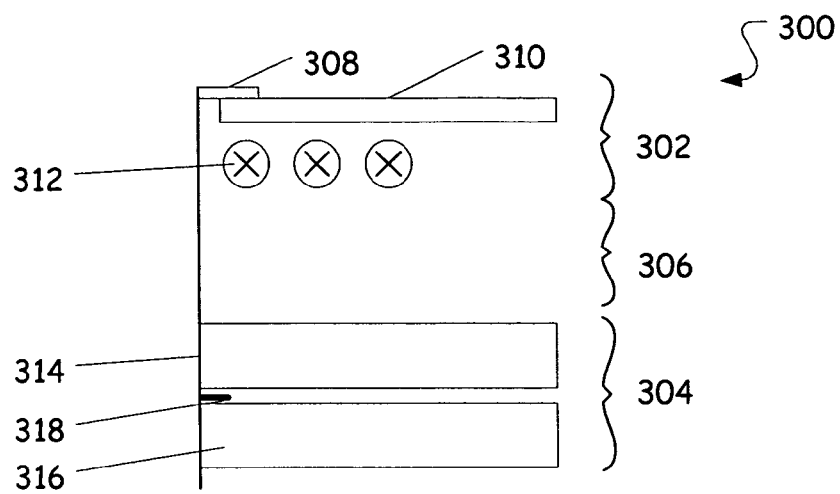

In accordance with a further embodiment of the present invention, a read/write head 300 is illustrated in FIG. 4. Read/write head 300 includes a write portion 302 and a read portion 304 separated by a gap 306. In this embodiment, write portion 302 only includes a main pole 308, a yoke 310 and a write coil 312. The elimination of a return pole and a back via prevents magnetic fields from disturbing a corresponding storage medium (such as through a side track erasure) and elements of read portion 306. Read portion 306 includes first and second read shields 314 and 316 with a read element 318 disposed therebetween.

Figure 5:
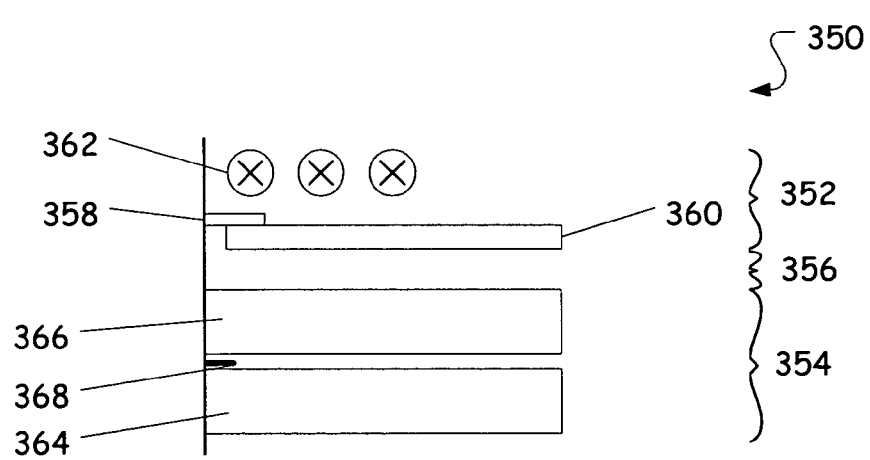

FIG. 5 is a cross-sectional view of an alternative embodiment of the present invention. In this embodiment, read/write head 350 includes a write portion 352 and a read portion 354 separated by a gap 356. Read portion 352 includes a main pole 358, a yoke 360 and a write coil 362. In this embodiment, main pole 358 and yoke 360 are positioned closer to read portion 354 than write coil 362. As a result, write coil 362 is less likely to disturb operation of elements of read portion 354, which includes a first and second shields 364 and 366 with a read element 368 disposed therebetween.

Figure 6:
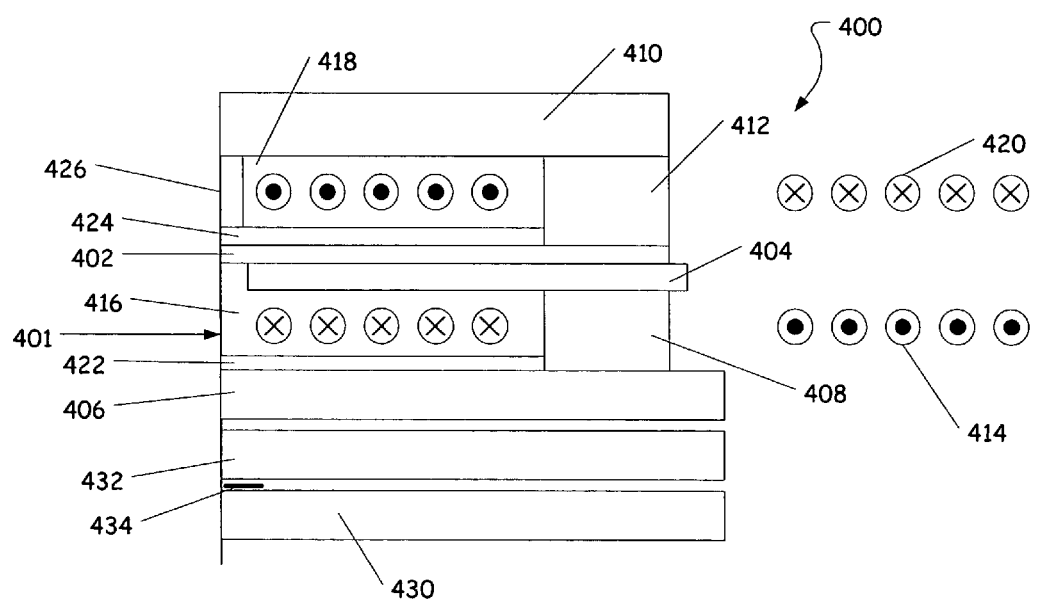

In accordance with a further embodiment of the present invention, multiple return poles can be used in the write portion of the read/write head. As illustrated in FIG. 6, read/write head 400 has an air bearing surface 401 and includes a main pole 402 coupled to a yoke 404. A leading return pole 406 is coupled to yoke 404 through a leading back gap closer 408 while a trailing return pole 410 is coupled to main pole 402 through a trailing back gap closer 412. A first pancake write coil 414 is wound around an axis of back closer 408 and electrically isolated from main pole 402 by insulator 416. Additionally, a second write coil 420 is wound around an axis of back closer 412 and insulated from main pole 402 by insulator 418. Current flows in coil 420 in a direction opposite to that of coil 414. If desired, a single helical coil can be used that wraps around a major axis of main pole 402. Additionally, read/write head 450 includes biasing layers 422 and 424 as well as a front shield 426. In one embodiment, biasing layers 422 and 424 are made of an anti-ferromagnetic material to assist in returning a gradient associated with main pole 402 to be parallel to air bearing surface 401 of read/write head 400. Front shield 426 can allow a reduced distance between main pole 402 and trailing return pole 410 and prevent unwanted magnetic fields from affecting the storage medium. Read shields 430 and 432 are positioned on either side of a read element 434 and are spaced apart from leading return pole 406.

Portions of the write elements can be of different shapes and sizes in accordance with embodiments of the present invention. As illustrated in FIGS. 7-10, different configurations for elements of the write portion are illustrated, such as various elliptical shapes. These elliptical shapes create a repeatable uniform domain structure and reduce parasitic effects in the write elements. Further description of elliptical shapes of the writer portion can be found in U.S. Pat. App. 2004/0021985, entitled "Rounded Top Pole", the contents of which are incorporated by reference. Various materials can also be chosen for the writer elements. For example, the material can be magnetically isotropic or have a uniaxial magnetic anisotropy that can be oriented parallel to an air bearing surface of the top pole. It is worth noting that the various elements for the write portions illustrated are interchangeable with the same elements in alternative write portions. For example, the main pole 522 of write portion 520 shown in FIG. 8 can replace the main pole of any of the write portions in FIGS. 7, 9 and 10 as well as be implemented in the write portions of FIGS. 2-6.

Figure 7:
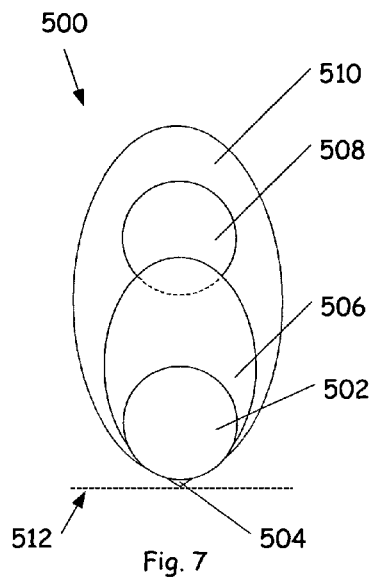
FIGS. 7-10 are schematic top down views of writer portions in accordance with alternative embodiments of the present invention.

In FIG. 7, write portion 500 includes a main pole 502 having a pole tip 504. Write portion 500 also includes a yoke 506, a back via 508 and a return pole 510. Main pole 502 and back via 508 are substantially circular. Additionally, yoke 506 and return pole 510 are elliptically shaped and have a major axis perpendicular to a bearing surface 512. In an alternative embodiment, yoke 506 and return pole 510 are of similar size. The elliptical shape of the elements illustrated in FIG. 7 provide a uniform ordering of spins in each respective element. Furthermore, the spins of each element are parallel to air bearing surface 512. As a result, flux escape from yoke 506 and return pole 510 to the data storage medium is prevented.

Figure 8:
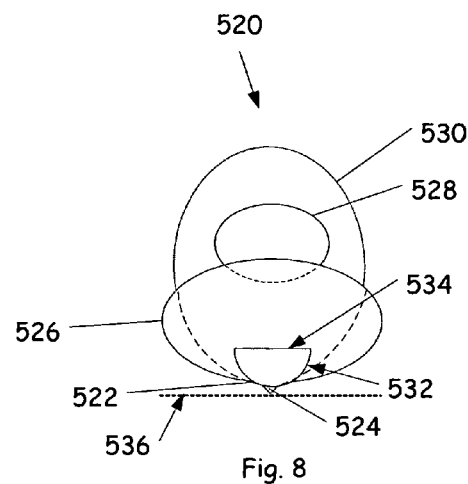

FIG. 8 illustrates an alternative read/write head including different shapes and sizes of elements of a write portion 520. Write portion 520 includes a main pole 522 having a pole tip 524. Additionally, write portion 520 includes a yoke 526, a back via 528 and a return pole 530. Main pole 522 includes a rounded portion 532 positioned on a side closest to pole tip 524 and a non-rounded portion 534 positioned opposite the side of the pole tip 524. The shape of main pole 522 aids in concentrating flux towards an adjacent storage medium. Yoke 526, back via 528 and return pole 530 are elliptical in shape. Yoke 526 and back via 528 have a major axis parallel to an air bearing surface 536 while return pole 530 includes a major axis perpendicular to air bearing surface 536.

Figure 9:
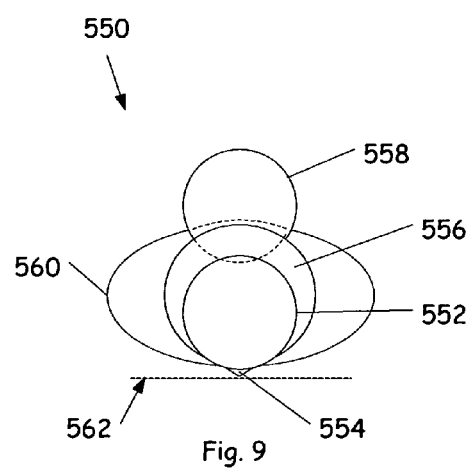

FIG. 9 illustrates yet a further embodiment for configurations of elements of a write portion. In FIG. 9, write portion 550 includes a main pole 552 having a pole tip 554, a yoke 556, a back via 558 and a return pole 560. Main pole 552 is round in shape as well as yoke 556. Back via 558 is also round in shape and coupled to return pole 560, which has an elliptical shape with a major axis parallel to an air bearing surface 562.

Figure 10:
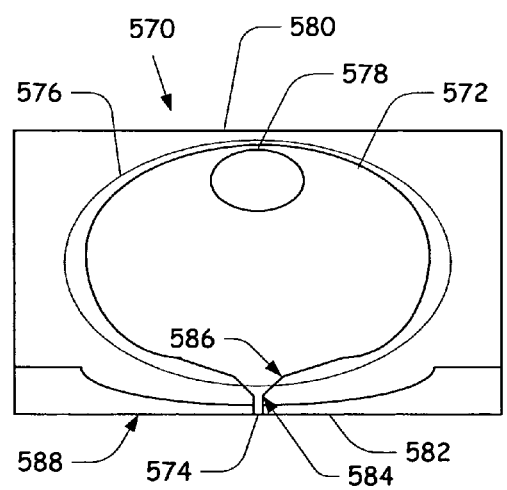

FIG. 10 illustrates yet a further embodiment for configuration of elements of a write portion. Write portion 570 includes a main pole 572 having a pole tip 574. Main pole 572 is coupled to a yoke 576, which is in turn coupled to a back via 578. A read shield 580 is coupled to the back via 578. Furthermore, a lower shield 582 is also provided. Pole tip 574 includes a first break point 584 and a second break point 586. In one embodiment, first break point 584 is positioned from air bearing surface 588 by a distance that is greater than the width of pole tip 574. In a further embodiment, second break point 586 is recessed from air bearing surface 588 by a distance that is at least about 0.5 microns. An angle associated with break point 584 relative to bearing surface 588 can illustratively be in a range from about 15 degrees to about 60 degrees and an angle associated with break point 586 relative to bearing surface 588 can be in a range from about 30 degrees to about 75 degrees.

FIGS. 11 and 12 illustrate alternative shapes for read shields according to embodiments of the present invention. In FIG. 11, read portion 600 includes a pair of elliptically shaped read shields 602 disposed on either side of a read element 604. Read shields 602 include an associated magnetic field gradient parallel to an air bearing surface 606. Alternatively, FIG. 12 illustrates a read portion 610 having a pair of substantially round read shields 612 disposed on either side of a read element 614. A magnetic field associated with read portion 610 is parallel to air bearing surface 616.

FIG. 13 is a cross-sectional view of an embodiment of a read portion 620 wherein magnetic read shields 622 and 624 have a laminated structure. The major ellipse axis of the magnetization of the magnetic read shields 622 and 624 are parallel to a bearing surface plane 621. The elliptical read shields have a uniform and reduced demagnetizing field compared to conventional rectangular shaped shields of the same size. Hence, a higher permeability of the magnetic read shields can be achieved, which will result in higher linear resolution of a read sensor 626. To prevent magnetic effects of the elements of an associated write portion on the domain structure of the magnetic read shields 622 and 624, each has a laminated structure.

Shield 622 includes a first ferromagnetic layer 628, a first anti-ferromagnetic layer 630, a non-magnetic spacer layer 632, a second anti-ferromagnetic layer 634 and a second ferromagnetic layer 636. First and second anti-ferromagnetic layers 630 and 634 are positioned on either side of non-magnetic spacer 632. First ferromagnetic layer 628 and second ferromagnetic layer 636 are coupled to first anti-ferromagnetic layer 630 and second anti-ferromagnetic layer 634, respectively. The anti-ferromagnetic layers 630 and 634 provide an exchange coupling for increased magnetic stability of shield 622.

Shield 624 includes a similar structure to shield 622. Shield 624 includes a first ferromagnetic layer 638, a first anti-ferromagnetic layer 640, a non-magnetic spacer layer 642, a second anti-ferromagnetic layer 644 and a second ferromagnetic layer 646, respectively. The number of layers in the magnetic read shields 622 and 624 can be different depending on total thickness of the shield. In one embodiment, the thickness of a shield can be in a range from about 10 nm to 100 nm Various materials can also be used for different layers. For example, the ferromagnetic layers can be made of a magnetic material with a low magnetic moment such as NiFe-based alloys. The non-magnetic spacers can be made of Ru, Cu, Cr, Au, Ag and/or alloys thereof The anti-ferromagnetic layers can be formed of Co or Co-based alloys. Further embodiments may utilize the laminated shield structure for both perpendicular and longitudinal recording applications.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the magnetic read/write head system while maintaining substantially the same functionality without departing from the scope and spirit of the present invention. In addition, although the preferred embodiment described herein is directed to a magnetic read/write head system for perpendicular recording, it will be appreciated by those skilled in the art that the teachings of the present invention can be applied to longitudinal recording, without departing from the scope and spirit of the present invention.

What is claimed is:

1. A transducer comprising:
    a first pole defining a bearing surface;
    a second pole spaced apart from the first pole to define a gap therebetween;
    a coil positioned between the first pole and the second pole such that a current applied to the coil will induce a magnetic field in at least one of the first pole and the second pole;
    a magnetic layer positioned between the first pole and the coil;
    a back via positioned between the magnetic layer and the second pole, wherein the coil is positioned between the back via and the bearing surface; and
    at least one non-magnetic spacer positioned between the first pole and the second pole, wherein the at least one non-magnetic spacer has a recessed surface that is closest to and spaced apart from the bearing surface and is positioned to space apart the back via and one of the magnetic layer and the second pole.

2. The transducer of claim 1 wherein the shape of the first pole is elliptical.

3. The transducer of claim 1 wherein the first pole comprises a rounded portion facing the bearing surface plane and a non-rounded portion opposite the rounded portion.

4. The transducer of claim 1 wherein the shape of the magnetic layer is elliptical.

5. The transducer of claim 1 wherein the shape of the back via is elliptical.

6. The transducer of claim 1 and further comprising:
    a first non-magnetic spacer positioned between the magnetic layer and the back via; and
    a second non-magnetic spacer positioned between the back via and the second pole.

7. The transducer of claim 1 wherein the shape of the second pole is elliptical.

8. The transducer of claim 1 wherein the shape of the second pole is similar to the shape of the magnetic layer.

9. The transducer of claim 1 wherein the second pole defines a recessed surface plane that is displaced from the bearing surface plane.

10. A transducer comprising:
    a writer portion comprising:
        a first pole defining a bearing surface plane;
        a second pole spaced apart from the first pole;
        a magnetic layer coupled to the first pole and positioned between the first pole and the second pole;
        a coil positioned such that a current applied to the coil will induce a magnetic field in the first pole and the magnetic layer;
        a back via positioned between the magnetic layer and the second pole, wherein the coil is positioned between the back via and the bearing surface plane; and
        at least one non-magnetic spacer positioned between the first pole and the second pole, wherein the at least one non-magnetic spacer has a recessed surface that is closest to and spaced apart from the bearing surface plane, and wherein the spacer is positioned to space apart the back via and one of the magnetic layer and the second pole;
    a sensing portion spaced apart from the writer portion and comprising:
        a sensing element; and
        a pair of shields positioned on opposing sides of the sensing element; and
    a non-magnetic shield positioned between the sensing portion and the writer portion, wherein the non-magnetic shield is conductive.

11. The transducer of claim 10 wherein the first pole, the second pole and the magnetic layer are elliptical in shape.

12. The transducer of claim 11 and further comprising:
    an elliptically shaped back via positioned between the magnetic layer and the second pole.

13. The transducer of claim 12 and further comprising:
    a first non-magnetic spacer positioned between the magnetic layer and the back via; and
    a second non-magnetic spacer positioned between the back via and the second pole.

14. The transducer of claim 10 wherein the size of the second pole is similar to the shape of the magnetic layer.

15. The transducer of claim 10 wherein the second pole defines a recessed surface plane that is displaced from the bearing surface plane.

16. The transducer of claim 10 wherein the non-magnetic shield has a recessed surface that is closest to and spaced apart from the bearing surface plane.

* * * * *